(12) United States Patent
Masaki et al.

(10) Patent No.: US 6,913,365 B2
(45) Date of Patent: Jul. 5, 2005

(54) LIGHT DIFFUSIVE PROTECTIVE FILM

(75) Inventors: Tadahiro Masaki, Shinjuku-ku (JP); Fumihiro Arakawa, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 380 days.

(21) Appl. No.: 10/067,548

(22) Filed: Feb. 7, 2002

(65) Prior Publication Data

US 2002/0163726 A1 Nov. 7, 2002

(30) Foreign Application Priority Data

Feb. 8, 2001 (JP) .......................................... 2001-031747

(51) Int. Cl.⁷ ............................................... F21V 8/00

(52) U.S. Cl. .......................... 362/31; 359/599; 359/566; 359/708; 385/141

(58) Field of Search ...................... 362/31, 26; 359/599, 359/566, 707–710; 349/52–68; 385/110–119, 147, 133, 141

(56) References Cited

U.S. PATENT DOCUMENTS

| | | | | |
|---|---|---|---|---|
| 6,445,504 | B1 * | 9/2002 | Suga et al. | 359/599 |
| 6,505,959 | B2 * | 1/2003 | Masaki et al. | 362/339 |
| 6,639,725 | B2 * | 10/2003 | Masaki et al. | 359/599 |
| 2003/0214719 | A1 * | 11/2003 | Bourdelais et al. | 359/599 |

FOREIGN PATENT DOCUMENTS

JP 7-234305 9/1995

* cited by examiner

*Primary Examiner*—Laura K. Tso
(74) *Attorney, Agent, or Firm*—Parkhurst & Wendel, L.L.P.

(57) ABSTRACT

A light diffusive protective film for a surface light source device for protecting other base material and improving the luminance of information display is disclosed which comprises a transparent plastic film and a concave/convex layer stacked on the surface of the transparent plastic film and satisfies requirements that: (1) the ten-point mean roughness of the uneven surface in the concave/convex layer is 0.5 $\mu$m to 2.0 $\mu$m; and (2) the count number of profile peaks is 16 to 60 as determined by measuring a roughness curve for the uneven surface of the concave/convex layer and determining the count number of profile peaks by a peak count method.

10 Claims, 2 Drawing Sheets

LIGHT DIFFUSIVE PROTECTIVE FILM

TECHNICAL FIELD

The present invention relates to a light diffusive protective film for use in a surface light source device and a process for producing the same.

PRIOR ART

A representative display device, in which light is applied from the back of the device to render images viewable, is a liquid crystal display device.

An example of the liquid crystal display device is shown in FIG. 1. A liquid crystal display device 100 comprises: a liquid crystal display panel 101 sandwiched between two polarizing plates 101a, 101a'; and a surface light source device 102 disposed on the underside (which, in use of the liquid crystal display device 100, corresponds to a side opposite to the viewer side) of the liquid crystal display device 100 shown in FIG. 1.

The surface light source device 102 comprises a reflector plate 103, a light guide plate 104, a light diffusive protective film 105, a lens sheet 106, and a protective film 107 which have been provided in that order.

The light guide plate 104 is a transparent plate having a dot pattern 104a on its underside, and a light source L is disposed at the left edge of the light guide plate 104. One light source L may be provided at each of left and light edges of the light guide plate 104.

In the surface light source device 102, light emitted from the light source L is introduced into the light guide plate 104. The light is repeatedly irregularly reflected within the light guide plate 104, is then reflected from the dot pattern 104a provided on the underside of the light guide plate 104, and goes out from the upper surface of the light guide plate 104 in various directions. Although the light goes out also from the underside of the light guide plate 104, this light is reflected from a reflector plate 103 and is returned to the interior of the light guide plate 104.

The light diffusive film 105 is provided on the light guide plate 104 to conceal the dot pattern 104a provided on the underside of the light guide plate 104.

The lens sheet 106 is, for example, such that a large number of prisms of rectangular equilateral triangle in section are arranged and stacked on the upper surface of a transparent plastic film in a longitudinal direction of the inner side in FIG. 1 and in left and right directions in the drawing.

The lens sheet 106 functions to focus light, which goes out from the light diffusive film 105 in various directions, in a direction around the front. Regarding the lens sheet 106, two lens sheets having an identical structure are put on top of each other so that the longitudinal direction of the prisms in one lens sheet is orthogonal to the longitudinal direction of the prisms in the other lens sheet. According to this construction, light is focused in a direction around the front in both horizontal and vertical directions.

In this way, light from the light source L goes out in a sheet form and is projected upward.

In the surface light source device shown in FIG. 1, a protective film 107 is disposed on the lens sheet 106.

The protective film 107 has the function of protecting the upper surface of the lens sheet 106 against scratching or contamination and, at the same time, has the function of concealing minute scratches produced or refuse adhered during the production of the surface light source device or fine particulate spacers used in the surface light source device. Further, the protective film 107 sometimes has light diffusing properties.

A typical conventional protective film 107 is formed by coating a coating composition containing organic or inorganic fine beads onto a transparent plastic film and drying or hardening the coating. In use, the protective film 107 is generally put on top of the lens sheet so that the coated surface of the matte film faces the lens sheet side.

When the protective film 107 is put on top of the lens sheet 106, however, in some cases, the surface of the lens sheet 106 is scratched by the beads contained in the protective film 107 due to very brittle nature of the surface of the lens sheet 106 and consequently is damaged. Further, in some cases, beads are separated from the protective film 107, and the separated beads move around a portion between the lens sheet 106 and the protective film 107 and consequently scratches both the lens sheet 106 and the protective film 107.

After the production of the surface light source device and the display device, they are generally subjected to a vibration test to examine the operation thereof. In this vibration test, the scratching and the separated beads may result in troubles of the devices.

Accordingly, the provision of a novel light diffusive protective film, which does not contain any bead, does not damage the surface of a counter base material in contact with the protective film, and has light diffusing properties, has been desired in the art.

SUMMARY OF THE INVENTION

The present inventors have now found that, according to a light diffusive protective film comprising a concave/convex layer, having an uneven surface with specific roughness values, stacked on the surface of a transparent plastic film, loss caused by scratching of other base material, by the film, in contact with the film can be prevented and light can be satisfactorily diffused and, as a result, the luminance of information display can be improved. The present invention has been made based on such finding.

Accordingly, it is an object of the present invention to provide a light diffusive protective film which has good light diffusing properties, can prevent scratching and loss of other base material, and can improve the luminance of information display.

Thus, according to one aspect of the present invention, there is provided a light diffusive protective film disposed in a surface light source device, said light diffusive protective film comprising a transparent plastic film and a concave/convex layer stacked on the surface of the transparent plastic film, said concave/convex layer satisfying requirements that:

(1) the ten-point mean roughness of the uneven surface in the concave/convex layer is 0.5 $\mu$m to 2.0 $\mu$m; and (2) the count number of profile peaks is 16 to 60 as determined by measuring a roughness curve for the uneven surface of the concave/convex layer, providing a center line with respect to the roughness curve, providing an upper peak count level and a lower peak count level, which are lines parallel to the center line, provided respectively at positions of ±0.1 $\mu$m in a vertical direction from the center line, and observing the roughness curve for a center line length of 0.8 mm to determine the count number of profile peaks for the center line length of 0.8 mm based on the assumption that, in an interval between two points where, after the roughness curve crosses the lower peak count level, the roughness curve next crosses the lower peak count level, when the number of times of crossing between the roughness curve and the upper peak count level is one or more, the number of profile peaks in this interval is "one."

According to another aspect of the present invention, there is provided a process for producing a light diffusive protective film comprising a transparent plastic film and a concave/convex layer stacked on the surface of the transparent plastic film, said process comprising the steps of:

providing a transparent plastic film;

bringing the transparent plastic film in a molding tool having concaves and convexes which have been formed by sandblasting and have an inverted shape of concaves and convexes of the concave/convex layer;

placing an ionizing radiation-curable resin between the molding tool and the transparent plastic film to prepare a laminate;

applying an ionizing radiation to the ionizing radiation-curable resin to form a cured product of the ionizing radiation-curable resin on the surface of the transparent plastic film; and separating the transparent plastic film with the cured product of the ionizing radiation-curable resin stacked thereon from the molding tool, thereby providing the light diffusive protective film.

DETAILED DESCRIPTION OF THE INVENTION

Light Diffusive Protective Film

Figure 2:
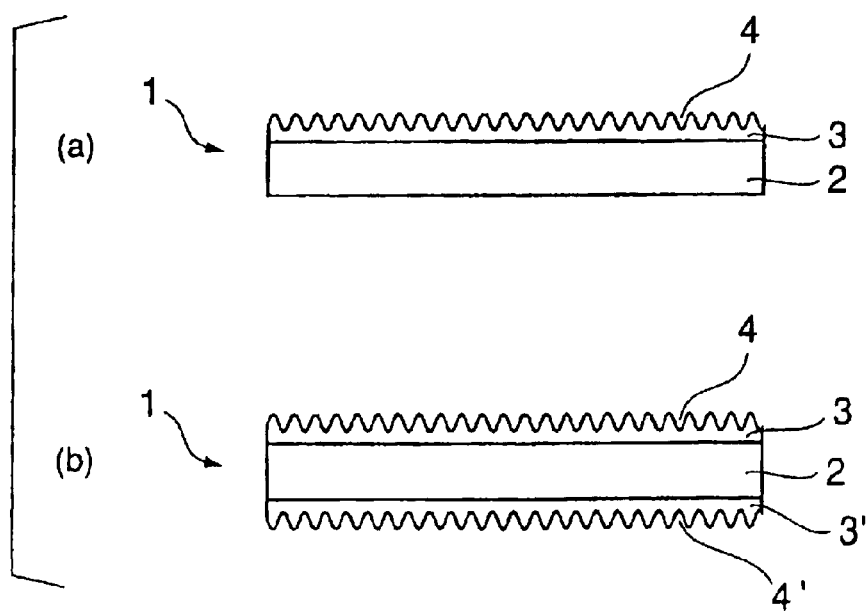
FIG. 2 is a cross-sectional view of a light diffusive protective film according to the present invention.

In a light diffusive protective film 1 according to the present invention, as shown in FIG. 2(a), a concave/convex layer 3 having concaves and convexes 4 is stacked on one side (upper surface in the drawing) of a transparent plastic film 2, or alternatively, as shown in FIG. 2(b), a concave/convex layer 3 having concaves and convexes 4 and a concave/convex layer 3' having concaves and convexes 4' are stacked respectively on both sides (upper surface and lower surface in the drawing) of a transparent plastic film 2.

In the present invention, concaves and convexes 4 (since the concaves and convexes 4' have the same construction as the concaves and convexes 4, the concaves and convexes will be hereinafter referred to as concaves and convexes 4 unless otherwise specified) satisfy the following requirements (1) and (2). That is, (1) the ten-point mean roughness of the uneven surface in the concave/convex layer is 0.5 $\mu$m to 2.0 $\mu$m; and (2) the count number of profile peaks is 16 to 60 as determined by measuring a roughness curve for the uneven surface of the concave/convex layer, providing a center line with respect to the roughness curve, providing an upper peak count level and a lower peak count level, which are lines parallel to the center line, provided respectively at positions of ±0.1 $\mu$m in a vertical direction from the center line, and observing the roughness curve for a center line length of 0.8 mm to determine the count number of profile peaks for the center line length of 0.8 mm based on the assumption that, in an interval between two points where, after the roughness curve crosses the lower peak count level, the roughness curve next crosses the lower peak count level, when the number of times of crossing between the roughness curve and the upper peak count level is one or more, the number of profile peaks in this interval is "one."

The ten-point mean roughness referred to in the requirement (1) is a measured value based on JIS B 0601-1994. More specifically, a reference length is sampled from a profile curve of an object, and an average line is determined, followed by the calculation of a difference between the average value of the heights of five highest profile peaks and the depths of five deepest profile valleys. This difference value is regarded as the ten-point mean roughness.

Regarding the requirement (1), the ten-point mean roughness of the concaves and convexes 4 is in the range of 0.5 $\mu$m to 2.0 $\mu$m.

When the ten-point mean roughness value is below the lower limit of the lower limit of the above-defined range, due to excessively small concaves and convexes 4, the function of concealing minute scratches produced or refuse adhered during the production of the surface light source device or fine particulate spacers used in the surface light source device is unsatisfactory.

On the other hand, when the ten-point means roughness value of the concaves and convexes 4 is above the upper limit of the above-defined range, the concealing function is higher than needed. Consequently, the sharpness of images viewed through the light diffusive protective film is sacrificed.

The count number in the requirement (2) is determined as follows.

Figure 3:
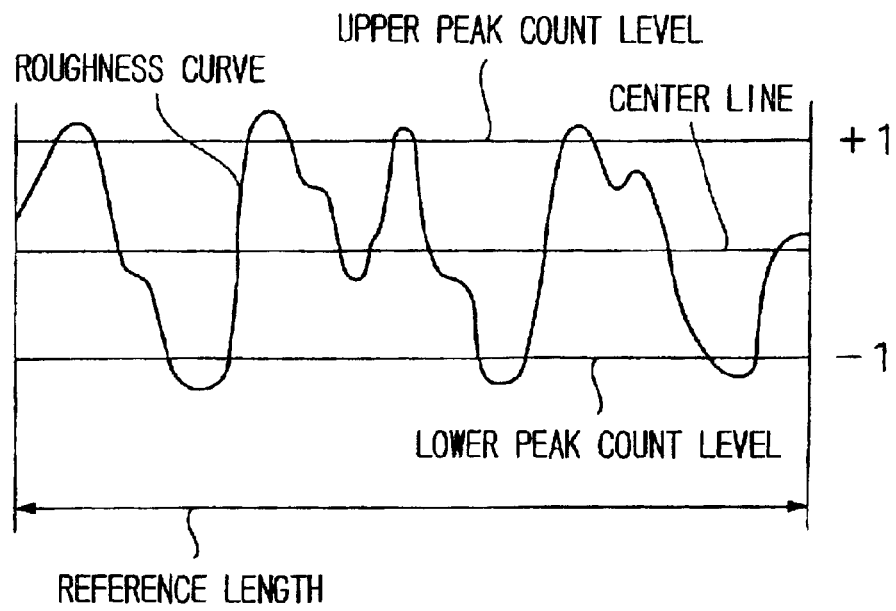
FIG. 3 is a diagram illustrating a peak count method using a roughness curve of an uneven surface.

As shown in FIG. 3, an upper peak count level and a lower peak count level are set parallel to the center line of a roughness curve. In this case, the distance between the upper peak count level and the center line is made equal to the distance between the lower peak count level and the center line. That is, an identical counter level is adopted.

The roughness curve is examined from the left side toward right side, and the count number is determined based on the assumption that, in an interval between two points where, after the roughness curve crosses the lower peak count level and goes toward the upper peak count level, the roughness curve next crosses the lower peak count level (in other words, in a period where the roughness curve is continuously located above the lower peak count level), when the number of times of crossing between the roughness curve and the upper peak count level is one or more, the number of profile peaks in this interval is "one." This counting method is often referred to as a peak count method.

In the present invention, calculation is carried out under conditions of an upper peak count level and a lower peak count level of ±0.1 $\mu$m from the center line of the roughness curve and a measurement length of 0.8 mm. More specifically, a roughness curve of the uneven surface in the concave/convex layer is measured, a center line is provided with respect to the roughness curve, an upper peak count level and a lower peak count level, which are lines parallel to the center line, are provided respectively at positions of ±0.1 µm in a vertical direction from the center line, and the roughness curve is observed for a center line length (a measurement length) of 0.8 mm to determine the count number of profile peaks based on the assumption that, in an interval between two points where, after the roughness curve crosses the lower peak count level, the roughness curve next crosses the lower peak count level, when the number of times of crossing between the roughness curve and the upper peak count level is one or more, the number of profile peaks in this interval is "one."

The count number in the requirement (2) is 16 to 60 for a measurement length of 0.8 mm.

When the count number is below the lower limit of the above-defined range, the concealing function is unsatisfactory due to excessively small number of concaves and convexes. On the other hand, when the count number exceeds the upper limit of the above-defined range, the concealing function is higher than needed. Consequently, the sharpness of images viewed through the light diffusive protective film is sacrificed.

a) Transparent Plastic Film

In the present invention, preferably, the material of the transparent plastic film 2 is transparent and smooth and, in addition, does not contain any foreign matter. Further, preferably, the transparent plastic film 2 is mechanically strong from the viewpoints of working and use applications.

Specific preferred examples of the transparent plastic film 2 include films of cellulose diacetate, cellulose triacetate, cellulose acetate butyrate, polyester, polyamide, polyimide, polyethersulfone, polysulfone, polypropylene, polymethylpentene, polyvinyl chloride, polyvinyl acetal, polyether ketone, polymethyl methacrylate, polycarbonate, and polyurethane.

Thermoplastic resin films of polyesters are preferred from the viewpoints of mechanical strength and suitability for coating. Thermoplastic resin films of cellulose triacetate are advantageously highly transparent, are not optically anisotropic, and have low refractive index. Thermoplastic resin films of polycarbonates are advantageously transparent and have heat resistance.

These thermoplastic resin films may be flexible or in a plate form.

The thickness of the thermoplastic resin film is preferably about 8 to 1000 µm, more preferably about 50 to 200 µm. In the case of plates, the thickness may exceed this thickness range.

In order to improve the adhesion between the transparent plastic film 2 and a concave/convex layer stacked on one side or both sides of the transparent plastic film 2, the transparent plastic film 2 may be previously subjected to physical and chemical treatments, such as corona discharge treatment and oxidation treatment, or may be previously coated with an anchor agent or a primer to form a primer layer (not shown).

b) Ionizing Radiation-curable Resin Composition

In the present invention, the ionizing radiation-curable resin composition refers to both an ultraviolet-curable resin composition and an electron beam-curable resin composition.

Accordingly, in a preferred embodiment of the present invention, the concave/convex layer 3 of the light diffusive protective film comprises a cured product of an ionizing radiation-curable resin. Further, according to a preferred embodiment of the present invention, in the light diffusive protective film, the concave/convex layer 3 is stacked onto both sides of the transparent plastic film.

The ionizing radiation-curable resin composition may be a mixture prepared by properly mixing prepolymer, oligomer, and/or monomer, having a polymerizable unsaturated bond or an epoxy group in the molecule thereof, together. Ionizing radiations applicable for curing include electromagnetic radiations or charged particle beams which have energy quantum high enough to polymerize or crosslink the molecule. In general, ultraviolet light or electron beam is used.

Examples of prepolymers and oligomers usable in the ionizing radition-curable resin composition include: unsaturated polyesters, such as condensates of unsaturated dicarboxylic acids with polyhydric alcohols; methacrylates, such as polyester methacrylate, polyether methacrylate, polyol methacrylate, and melamine methacrylate; acrylates, such as polyester acrylate, epoxy acrylate, urethane acrylate, polyether acrylate, polyol acrylate, and melamine acrylate; and cationically polymerizable epoxy compounds.

Examples of monomers usable in the ionizing radiation-curable resin composition include: styrene monomers, such as styrene and α-methylstyrene; acrylic esters, such as methyl acrylate, 2-ethylhexyl acrylate, methoxyethyl acrylate, butoxyethyl acrylate, butyl acrylate, methoxybutyl acrylate, and phenyl acrylate; methacrylic esters, such as methyl methacrylate, ethyl methacrylate, propyl methacrylate, methoxyethyl methacrylate, ethoxymethyl methacrylate, phenyl methacrylate, and lauryl methacrylate; unsaturated substituted amino alcohol esters, such as 2-(N,N-diethylamino)ethyl acrylate, 2-(N,N-dimethylamino)ethyl acrylate, 2-(N,N-dibenzylamino)methyl acrylate, and 2-(N,N-diethylamino)propyl acrylate; unsaturated carboxylic acid amides, such as acrylamide and methacrylamide; compounds, such as ethylene glycol diacrylate, propylene glycol diacrylate, neopentyl glycol diacrylate, 1,6-hexanediol diacrylate, and triethylene glycol diacrylate; polyfunctional compounds, such as dipropylene glycol diacrylate, ethylene glycol diacrylate, propylene glycol dimethacrylate, and diethylene glycol dimethacrylate; and polythiol compounds having two or more thiol groups in the molecule thereof, for example, trimethylolpropane trithioglycolate, trimethylolpropane trithiopropylate, and pentaerythritol tetrathioglycolate.

One compound or a mixture of two or more compounds described above is used as the monomer in the ionizing radiation-curable resin composition. Preferably, in order to impart usual coatability to the ionizing radiation-curable resin composition, the ionizing radiation-curable resin composition comprises not less than 5% by weight of the prepolymer or the oligomer and not more than 95% by weight of the monomer and/or the polythiol compound.

When flexibility is required of a cured product of the ionizing radiation-curable resin composition, the amount of the monomer may be reduced, or alternatively, an acrylate monomer having one or two functional groups may be used. When a cured product of the ionizing radiation-curable resin composition is required to have abrasion resistance, heat resistance, and solvent resistance, this can be achieved by the design of the ionizing radiation-curable resin composition, for example, by using an acrylate monomer having three or more functional groups. Here acrylate monomers having one functional group include 2-hydroxy acrylate, 2-hexyl acrylate, and phenoxyethyl acrylate. Acrylate monomers having two functional groups include ethylene glycol diacrylate and 1,6-hexanediol diacrylate. Acrylate monomers having three or more functional groups include trimethylolpropane triacrylate, pentaerythritol triacrylate, pentaerythritol tetraacryalte, and dipentaerythritol hexaacrylate.

When the regulation of flexibility, surface hardness or other properties of the cured product of the ionizing radiation-curable resin composition is required, a resin, which is uncurable by the application of an ionizing radiation, may also be added to the ionizing radiation-curable resin composition. Specific examples of such resins include thermoplastic resins, such as polyurethane resin, cellulose resin, polyvinylbutyral resin, polyester resin, acrylic resin, polyvinyl chloride resin, and polyvinyl acetate. Among others, the addition of polyurethane resin, cellulose resin, polyvinylbutyral resin or the like is preferred from the viewpoint of improving the flexibility.

When the ionizing radiation-curable resin composition is cured by the application of light, particularly ultraviolet light, photopolymerization initiators or photopolymerization accelerators are added to the ionizing radiation-curable resin composition. In the case of a resin system having a radically polymerizable unsaturated group, for example, acetophenones, benzophenones, Michler's benzoyl benzoate, α-amyloxime esters, thioxanthones, benzoins, and benzoin methyl ether may be used as the photopolymerization initiator either solely or as a mixture of two or more. On the other hand, in the case of a resin system having a cationically polymerizable functional group, for example, aromatic diazonium salts, aromatic sulfonium salts, aromatic iodonium salts, metallocene compounds, and benzoinsulfonic esters may be used as the photopolymerization initiator either solely or as a mixture of two or more. The amount of the photopolymerization initiator added is 0.1 to 10 parts by weight based on 100 parts by weight of the ionizing radiation-curable resin composition.

In addition, sensitizers, such as n-butylamine, triethylamine, and tri-n-butylphosphine, may be used.

The following reactive organosilicon compounds may be used in combination with the ionizing radiation-curable resin composition.

First examples of reactive organosilicon compounds usable herein are those represented by formula $R_mSi(OR^3)_n$ wherein R and $R^3$ represent an alkyl group having 1 to 10 carbon atoms; and m and n are each an integer which satisfies a requirement represented by m+n=4.

Specific examples thereof include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Second examples of reactive organosilicon compounds usable in combination with the ionizing radiation-curable resin composition include silane coupling agents.

Specific examples thereof include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropyltrimethoxysilane, N-β-(N-vinylbenzylaminoethyl)-γ-aminopropylmethoxysilane hydrochloride, γ-glycidoxypropyltrimethoxysilane, aminosilane, methyltrimethoxysilane, vinyltriacetoxysilane, γ-mercaptopropyltrimethoxysilane, γ-chloropropyltrimethoxysilane, hexamethyldisilazane, vinyltris(β-methoxyethoxy)silane, octadecyldimethyl[3-(trimethoxysilyl)propyl]ammonium chloride, methyltrichlorosilane, and dimethyldichlorosilane.

Third examples of reactive organosilicon compounds usable in combination with the ionizing radiation-curable resin composition include ionizing radiation-curable silicon compounds.

Specific examples thereof include organosilicon compounds having a plurality of functional groups, which are reacted and crosslinked upon the application of an ionizing radiation, for example, organosilicon compounds having a polymerizable double bond group with a molecular weight of not more than 5,000. More specific examples of these reactive organosilicon compounds include functional polysilanes having vinyl at one terminal, functional polysilanes having vinyl at both terminals, functional polysiloxanes having vinyl at one terminal, functional polysiloxanes having vinyl at both terminals, and polysilanes having vinyl as a functional group or polysiloxanes having vinyl as a functional group produced by reacting these compounds.

More specifically, compounds represented by formulae (A) to (E) may be mentioned.

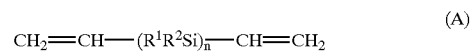

(A)

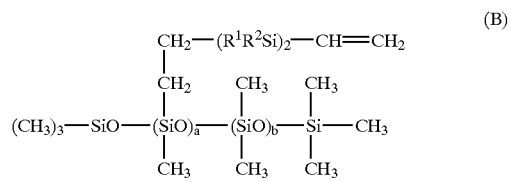

(B)

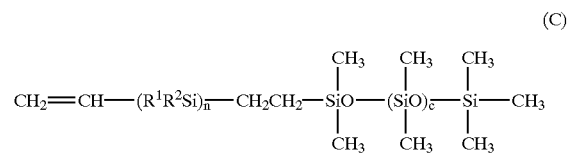

(C)

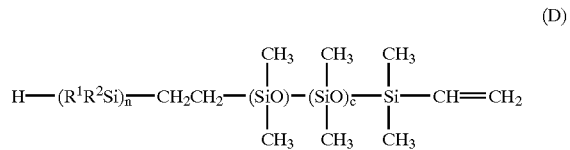

(D)

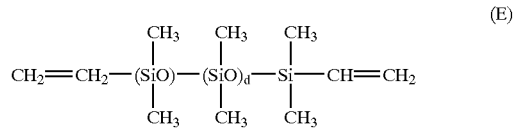

(E)

In formulae (A) to (E), $R^1$ and $R^2$ represent an alkyl group having 1 to 4 carbon atoms, and a to d and n are values that bring the molecular weight of the compound to not more than 5,000.

Other organosilicon compounds usable in combination with the ionizing radiation-curable resin composition include (meth)acryloxysilane compounds, such as 3-(meth)acryloxypropyltrimethoxysilane and 3-(meth)acryloxypropylmethyldimethoxysilane.

Applications of Light Diffusive Protective Film

Figure 1:
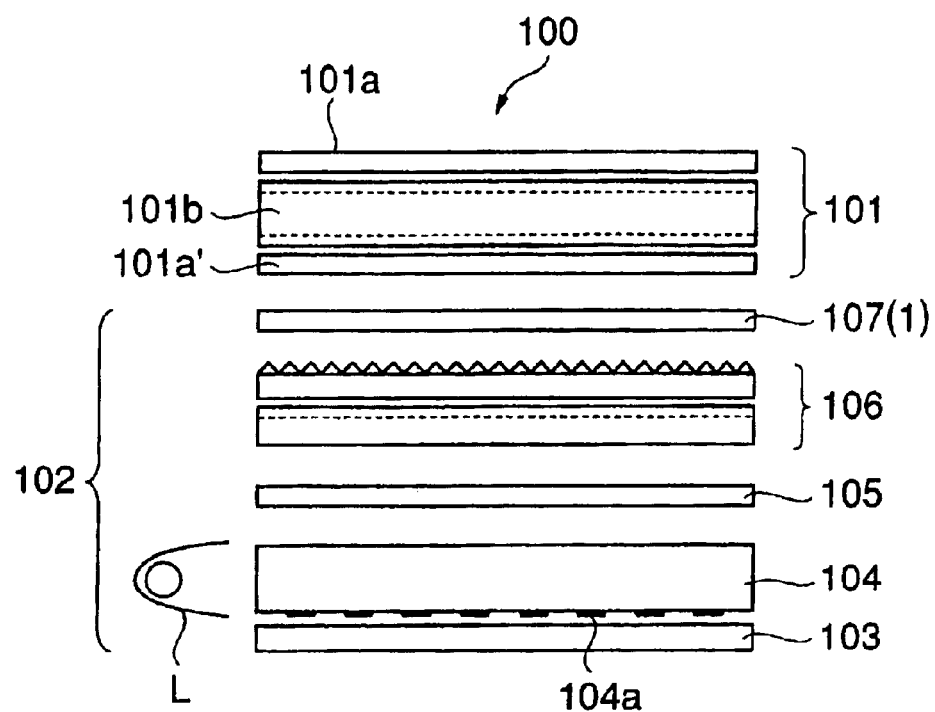
FIG. 1 is a diagram showing conventional surface light source device and liquid crystal display device, using a protective film.

The light diffusive protective film 1 according to the present invention is placed, instead of the protective film 107 shown in FIG. 1, on the lens sheet 106 in the surface light source device 102. In use, a display device 100 may be disposed on the surface light source device 102 in combination with the light diffusive protective film 1.

As shown in FIG. 2(a), in the light diffusive protective film 1, when the concave/convex layer 3 has been stacked on only one side of the transparent plastic film 2, in use, the light diffusive protective film 1 is put on top of the lens sheet 106 so that the concave/convex layer 3 faces the lens sheet 106 side.

Accordingly, in a preferred embodiment of the present invention, there is provided a surface light source device 102 comprising a light source L, a light diffusive film 105, a lens sheet 106, and a light diffusive protective film 1 according to the present invention (provided instead of the protective film 107 in FIG. 1) disposed in that order. According to a preferred embodiment of the present invention, the light diffusive film 105 is identical to the light diffusive protective film 1 according to the present invention.

Further, in a preferred embodiment of the present invention, there is provided a display device 100 comprising the above-described surface light source device 102 and a display panel 101 disposed on the top of the surface light source device 102. According to a preferred embodiment of the present invention, the display device 100 is a liquid crystal display device.

Production Process of Light Diffusive Protective Film

According to another aspect of the present invention, there is provided a process for producing the light diffusive protective film of the present invention. According to the production process of the present invention, a concave/convex layer can be imparted to the transparent plastic film without the incorporation of organic or inorganic fine beads. Imparting the concave/convex layer may be carried out by the so-called "embossing method" wherein an embossing plate, preferably an embossing roll in a roll form, is pressed, optionally with heating, against a resin layer after or during the formation thereof. More preferably, a method may be adopted which comprises the steps of: providing a concave/convex mold having on its surface concaves and convexes, which have an inverted shape of desired concaves and convexes to be formed; coating a highly curable resin composition, such as an ultraviolet-curable resin, onto the mold surface; covering the coating with a transparent plastic film; applying ultraviolet light to cure the ultraviolet-curable resin or the like within the concave/convex mold and, in addition, integrating the cured coating with the transparent plastic film to form a laminate; and then separating the laminate from the concave/convex mold.

The latter method is superior particularly in reproduction of the mold to the embossing method and thus can provide contemplated optical characteristics. Further, the latter method can eliminate the drawback of products provided by the embossing method that concaves and convexes undergo deformation with the elapse of time. As a result, a fined and hard concave/convex layer can be provided.

Figure 4:
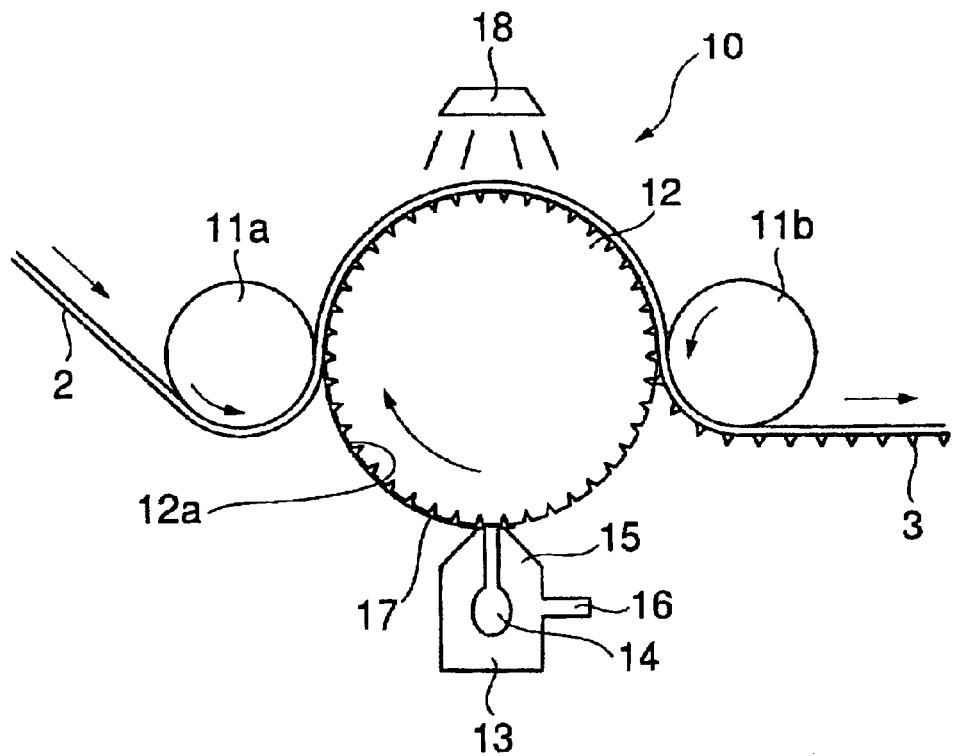
FIG. 4 is a diagram showing an embodiment of a production process of the light diffusive protective film according to the present invention.

FIG. 4 is a diagram illustrating a production process using an embossing device 10 wherein the above-described ultraviolet-curable resin or the like is used.

At the outset, a transparent plastic film 2 is unwound from left, and is supplied toward and brought in an embossing roll 12. The backside of the embossing roll 12 is an concave/convex mold face having concaves and convexes 12a which have an inverted shape of desired concaves and convexes.

A coating head 13 is installed at the bottom of the embossing roll 12, and an ultraviolet-curable resin composition 14 is fed from a liquid reservoir (not shown) through a pipe 16 to the coating head 13. The fed ultraviolet-curable resin composition 14 is extruded through a slit 15, which is opened toward the upper part of the coating head 13, and is deposited onto the embossing roll 12 in its molding face having concaves and convexes 12a. The deposited ultraviolet-curable resin composition is then moved left by the rotation of the embossing roll 12 (in the drawing, rotation in clockwise direction), and the transparent plastic film 2 and an ultraviolet-curable resin composition layer 17 are laminated onto each other between the embossing roll 12 and the nip roll 11a on the film feed side.

Instead of this method wherein the ultraviolet-curable resin composition 14 is deposited onto the mold face followed by lamination of the transparent plastic film 2 onto the coating, a method may be adopted wherein, while winding the transparent plastic film 2 on the embossing roll 12, the ultraviolet-curable resin composition 14 is fed into between the transparent plastic film 2 and the embossing roll 12 to laminate the ultraviolet-curable resin composition layer 17 onto the transparent plastic film 2.

The laminate of the transparent plastic film 2 and the ultraviolet-curable resin composition layer 17 is moved to the upper part of the embossing roll 12, and is irradiated with ultraviolet light from an ultraviolet exposure system 18 installed above the embossing roll 12 to cure the ultraviolet-curable resin composition layer 17 and to adhere the cured product to the transparent plastic film 2.

The laminate of the transparent plastic film 2 and the cured ultraviolet-curable resin composition layer 17 is moved to the right side of the embossing roll 12, and is separated by means of a separation roll 11b from the embossing roll 12. Thus, a light diffusive protective film is prepared which comprises a transparent plastic film 2 and, stacked on the transparent plastic film 2, a concave/convex layer, formed of a cured product of the ultraviolet-curable resin, which has an inverted shape of the concaves and convexes in the concave/convex mold face of the embossing plate.

According to another embodiment of the present invention, a flat embossing plate may also be used in the production of the light diffusive protective film 1 according to the present invention.

The concave/convex mold face in the embossing roll 12, the flat embossing plate or the like may be formed by various methods. For example, sandblasting is a preferred embossing plate formation method which is advantageously excellent in reproduction of the shape of concaves and convexes ($R_2$ and peak count) and has good general-purpose properties.

Materials usable for constituting a molding tool having concaves and convexes include metals, plastics, and wood and composites of these materials. The metal is preferably chromium from the viewpoints of strength and low susceptibility to abrasion in repeated use. A material prepared by plating the surface of an iron roll with chromium is preferred, for example, for economic reasons.

Particles usable for blasting include metal particles and inorganic particles, such as silica, alumina, or glass particles. The particle size (diameter) of these particles is, for example, about #60 to #350.

In blasting these particles against the molding tool, the particles may be blasted together with high-speed gas. In this case, a liquid sandblasting utilizing a liquid, for example, water may be utilized in combination of the blasting of the particles. The liquid sandblasting is advantageous over a dry method, wherein no liquid is used in combination with the blasting of the particles, from the viewpoints of excellent reproduction and good work environment.

From the viewpoint of improving the durability of the molding tool during use thereof, prior to use, the concave/convex face having thereon concaves and convexes is preferably plated with chromium or the like to improve the hardness of the surface of the molding tool and to improve the corrosion resistance of the molding tool. When plating somewhat affects the shape of concaves and convexes, this is preferably taken into consideration at the time of sandblasting.

EXAMPLES

Example 1

A chromium-plated roll, wherein the surface of an iron roll had been plated with chromium to a thickness of 20 μm, was provided. 250-mesh iron particles, together with water, were blasted against the surface of the chromium-plated roll to form concaves and convexes on the surface of the roll. Thereafter, the concave/convex face was plated with chromium to prepare a finely matte finished embossing roll, that is, an embossing roll having on its surface fine concaves and convexes.

The apparatus, which had been described above in conjunction with FIG. 4, was provided, and an ultraviolet-curable resin (RC 19-941, manufactured by Dainippon Ink and Chemicals, Inc.) was coated on the embossing roll. A polyethylene terephthalate resin film was laminated as a transparent plastic film onto the coated embossing roll. Subsequently, ultraviolet light was applied from an ultraviolet light source (D-bulb, manufactured by Fusion) to the laminate through the transparent plastic film. Thereafter, the laminate was separated from the embossing roll to prepare a light diffusive protective film having a concave/convex layer according to the present invention.

The uneven surface of the concave/convex layer in the light diffusive protective film thus obtained had a ten-point mean roughness of 1.15 μm.

The count number of profile peaks as measured under conditions of a peak count level of ±0.1 μm from the center line of the roughness curve and a measurement length of 0.8 mm was 23.

The light diffusive protective film prepared above was used instead of the protective film 107 in FIG. 1. Regarding the lens sheet 106, two sheets, in which grooves of rectangular equilateral triangle in section had been arranged at equal pitches (BEF, manufactured by Sumitomo 3M Ltd.), were put on top of each other so that, for both the sheets, the lens surface faced upward and, in addition, the direction of the grooves in one sheet was orthogonal to the direction of the grooves in the other sheet. A film manufactured by TSUJIDEN Co., Ltd. (stock number: D 121) was used as the light diffusive protective film 105 provided on the underside of the lens sheet 106. In this way, a surface light source device was assembled.

COMPARATIVE EXAMPLE

In this comparative example, a surface light source device was assembled in the same manner as in Example 1, except that a conventional film having a bead-containing resin layer (stock number: D 117 U, manufactured by TSUJIDEN Co., Ltd.) was used instead of the film 107.

Evaluation

The surface light source devices prepared in Example 1 and the comparative example were measured for front luminance with a color luminance meter (stock number: BM-7, manufactured by Topcon Corp.) at an angle of visibility of 2 degrees. As a result, the front luminance was 1386 cd/m$^2$ for Example 1 and was 1361 cd/m$^2$ for the comparative example.

Further, a weight of 50 g was put on the light diffusive protective film (107) in the surface light source devices prepared in Example 1 and the comparative example, and the film was pulled in a plane direction at a speed of 100 mm/sec. The lens sheets were then inspected for scratches on the surface thereof. For Example 1, there was no scratch on the surface of the lens sheet, whereas, for the comparative example, there were scratches on the surface of the lens sheet along the pulling direction of the light diffusive protective film and, in addition, the separation of beads was also found.

What is claimed is:

1. A light diffusive protective film disposed in a surface light source device, said light diffusive protective film comprising
   a transparent plastic film and a concave/convex layer stacked on the surface of the transparent plastic film, said concave/convex layer satisfying requirements that:
   (1) the ten-point mean roughness of the uneven surface in the concave/convex layer is 0.5 μm to 2.0 μm; and
   (2) the count number of profile peaks is 16 to 60 as determined by measuring a roughness curve for the uneven surface of the concave/convex layer, providing a center line with respect to the roughness curve, providing an upper peak count level and a lower peak count level, which are lines parallel to the center line, provided respectively at positions of ±0.1 μm in a vertical direction from the center line, and observing the roughness curve for a center line length of 0.8 mm to determine the count number of profile peaks for the center line length of 0.8 mm based on the assumption that, in an interval between two points where, after the roughness curve crosses the lower peak count level, the roughness curve next crosses the lower peak count level, when the number of times of crossing between the roughness curve and the upper peak count level is one or more, the number of profile peaks in this interval is "one."

2. The light diffusive protective film according to claim 1, wherein the concave/convex layer comprises a cured product of an ionizing radiation-curable resin.

3. The light diffusive protective film according to claim 1, wherein the concave/convex layer is stacked on both sides of the transparent plastic film.

4. A surface light source device comprising a light source, a light diffusive film, a lens sheet, and the light diffusive protective film according to claim 1 which have been disposed in that order.

5. The surface light source device according to claim 4, wherein the light diffusive film is identical to the light diffusive protective film according to claim 1.

6. A display device comprising the surface light source device according to claim 4 and a display panel disposed on the top of the surface light source device.

7. The display device according to claim 6, which is a liquid crystal display device.

8. A process for producing a light diffusive protective film according to claim 1 comprising a transparent plastic film and a concave/convex layer stacked on the surface of the transparent plastic film, said process comprising the steps of:

providing a transparent plastic film;

bringing the transparent plastic film in a molding tool having concaves and convexes which have been formed by sandblasting and have an inverted shape of concaves and convexes of the concave/convex layer;

placing an ionizing radiation-curable resin between the molding tool and the transparent plastic film to prepare a laminate;

applying an ionizing radiation to the ionizing radiation-curable resin to form a cured product of the ionizing radiation-curable resin on the surface of the transparent plastic film; and separating the transparent plastic film with the cured product of the ionizing radiation-curable resin stacked thereon from the molding tool, thereby providing the light diffusive protective film.

9. The process according to claim 8, wherein the molding tool is in a roll form and the transparent plastic film is brought in the molding tool.

10. A light diffusive protective film produced by the process according to claim 8.

* * * * *